United States Patent Office 2,910,523
Patented Oct. 27, 1959

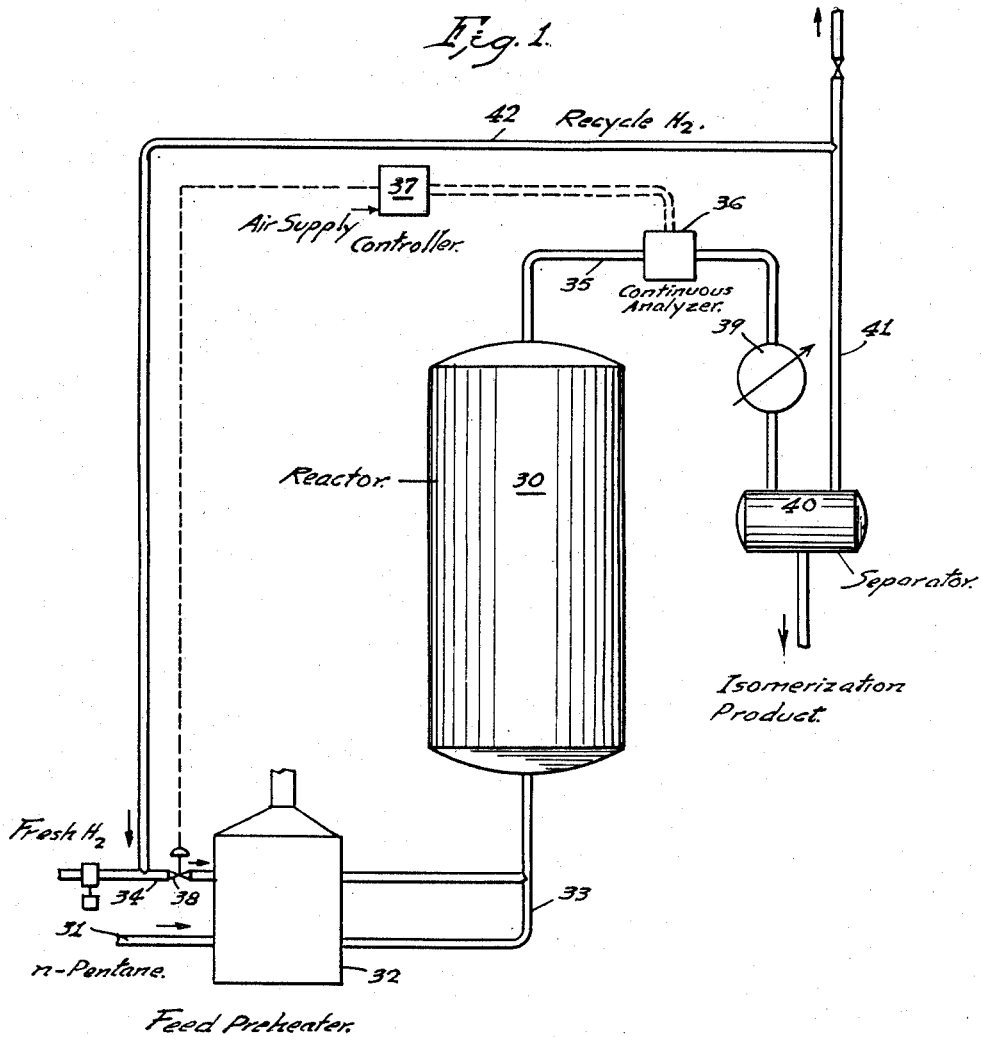

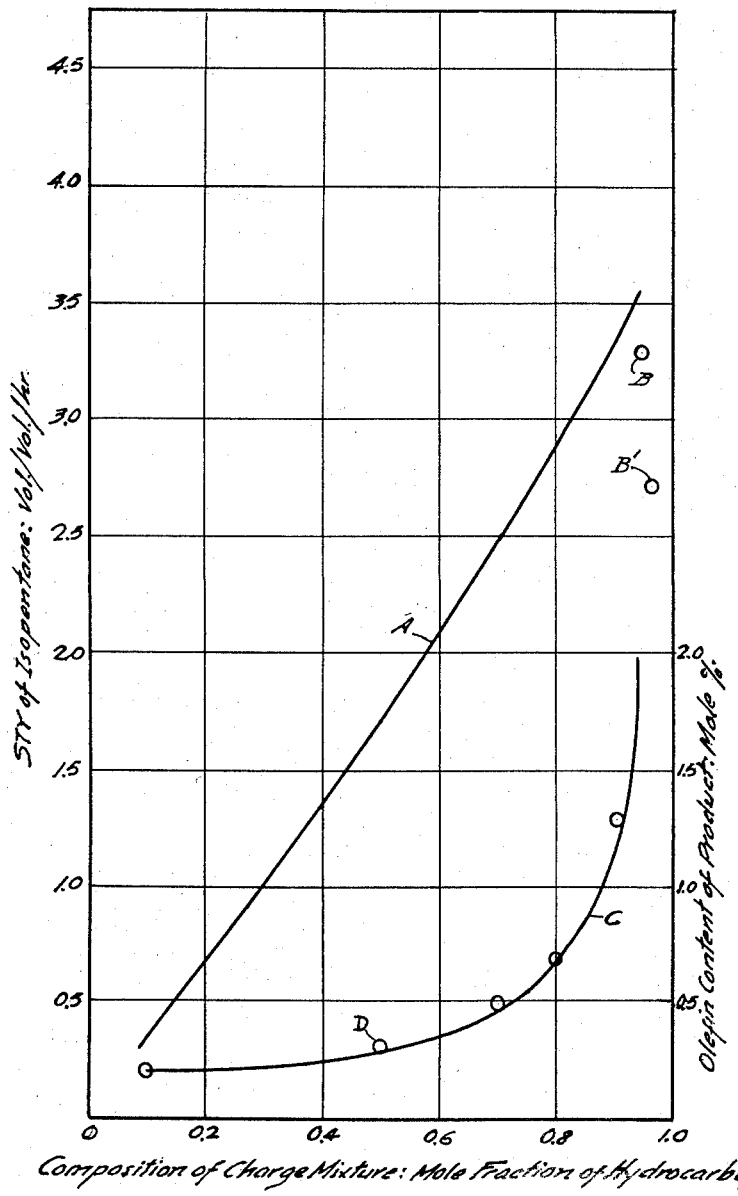

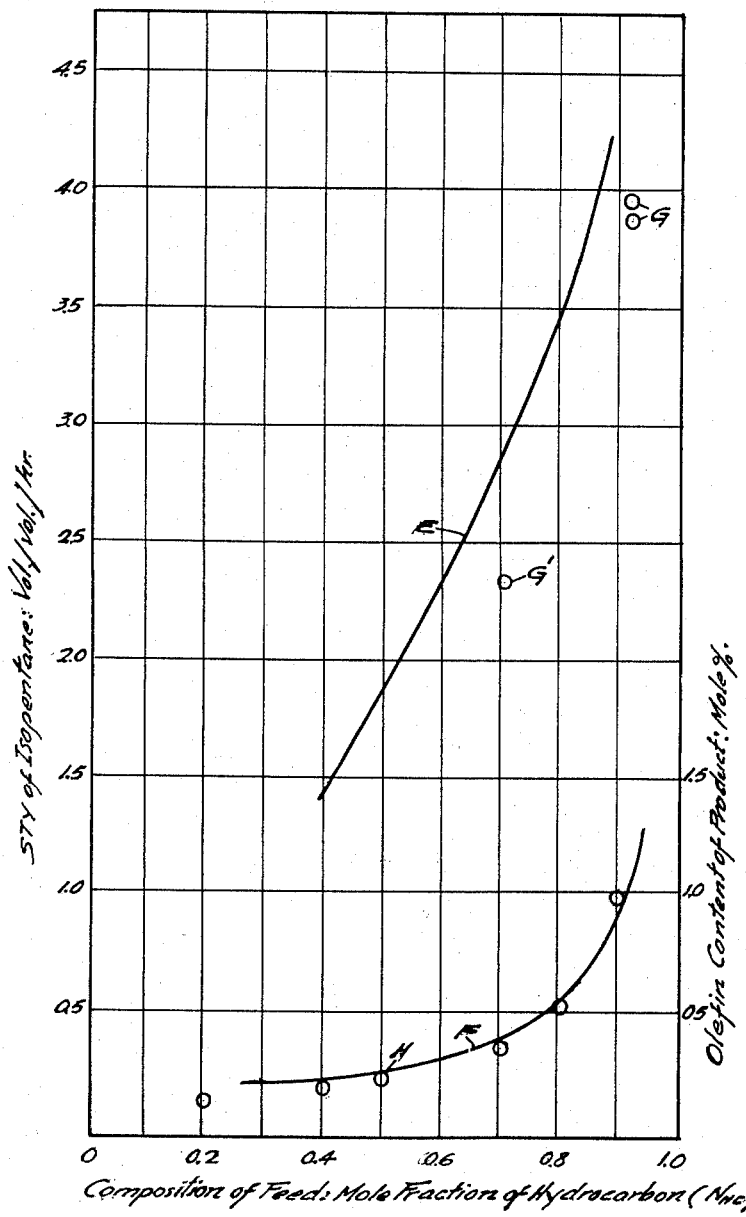

2,910,523
HYDROISOMERIZATION PROCESS

Charles W. Montgomery, Oakmont, William C. Starnes, Pittsburgh, and Robert C. Zabor, Glenshaw, Pa., assignors to Gulf Research & Development Company, Pittsburgh, Pa., a corporation of Delaware Application May 8, 1956, Serial No. 583,497
5 Claims. (Cl. 260—683.65)

This invention relates to a process for isomerizing n-pentane to isopentane in the presence of hydrogen and a solid catalyst. More particularly, it relates to an improvement in the control of the operating conditions of such a process.

The conversion of n-pentane to isopentane has great commercial importance in the petroleum and chemical industries. It is important in petroleum refining because isopentane is valuable as a high octane number component of gasoline. Isopentane is also valuable as a chemical reactant, for example, as a raw material in the production of isoprene. The present process therefore is valuable for increasing the isopentane content of a refinery pentane fraction to be used as a gasoline component and for producing substantially pure isopentane as a chemical reagent or raw material.

A new and improved process for isomerizing n-pentane to isopentane has been described in the patent application of William C. Starnes and Robert C. Zabor, Serial No. 508,980, filed May 17, 1955, now U.S. Patent No. 2,831,908. The process is characterized by such features as the use of a supported platinum catalyst, the use of a low hydrogen concentration in the feed and a high space velocity as compared with naphtha reforming operations. The novel process results in an unusually high space-time-yield of isomer product and a high process efficiency. The present invention provides a further improvement in the Starnes and Zabor process. The process of the invention is particularly concerned with the control of olefin concentration of the product so as to avoid rapid aging of the supported platinum catalyst.

The process of the invention in general comprises contacting a feed mixture of n-pentane and hydrogen with a supported platinum catalyst at a temperature from 700° to 1000° F., and a liquid-hourly space velocity of at least five volumes of n-pentane per volume of catalyst per hour, the concentration of hydrocarbon in the feed being high, for example, greater than a mol fraction of 0.5, but less than the concentration which corresponds to rapid catalyst aging under the process conditions. An isomerization product is withdrawn and its olefin content is measured. The hydrogen concentration of the feed is adjusted in response to changes in the olefin concentration of the product so as to maintain said olefin concentration below the concentration corresponding to rapid catalyst deactivation under the process conditions.

In describing our invention more fully, we will refer to the drawings, of which

Figure 1 is a diagrammatic illustration of apparatus with which the process of the invention can be carried out; and Figures 2 and 3 are graphic representations of the relationships between olefin concentration of the isomerization product, catalyst life and space-time-yield of isopentane in the isomerization of n-pentane.

We have discovered that when n-pentane is isomerized to isopentane the reaction product contains olefinic hydrocarbons, principally pentenes, the concentration of which in the isomerization product depends upon the reaction variables of temperature and pressure and the concentration of hydrogen in the charge stock to the process. We have further discovered that the concentration of olefinic hydrocarbons in the isomerization product is related to catalyst aging rate. We have carried out a number of runs in the hydroisomerization of n-pentane which demonstrate these facts and the principles of our invention. One series of such runs was carried out as described in the following example.

EXAMPLE I

The catalyst employed was a platinum-alumina catalyst which consisted essentially of 0.57 weight percent platinum, 0.64 weight percent chlorine, and the balance alumina. The surface area of the calcined catalyst was 295.7 square meters per gram. The fixed bed isomerization reactor contained 60 cc. or 48.9 grams of the platinum-alumina catalyst. Before placing the reactor containing the freshly calcined catalyst on-stream, the catalyst was heated to 1000° F. in a stream of hydrogen for a period of several hours and the reactor was pressured to the reaction pressure of 500 pounds per square inch gauge. For each run the reaction temperature was

*Table 1*

| Run No. | 1 | 2 | 3 | 4 | 5 | 6 | 7 | 8 | 9 | 10 | 11 | 12 |
|---|---|---|---|---|---|---|---|---|---|---|---|---|
| Throughput age at start of cycle | 247 | 259 | 268 | 288 | 305 | 320 | 343 | 370 | 398 | 447 | 478 | 512 |
| Temperature, °F | 830 | 830 | 830 | 828 | 831 | 828 | 831 | 831 | 829 | 829 | 829 | 829 |
| Pressure, p.s.i.g. | 500 | 500 | 500 | 500 | 500 | 500 | 500 | 500 | 500 | 500 | 500 | 500 |
| Space velocity, vol./hr./vol. | 6.6 | 1.3 | 4.8 | 8.4 | 3.0 | 6.6 | 9.0 | 9.0 | 9.6 | 10.1 | 10.6 | 11.3 |
| Hydrogen feed rate, s.c.f./hr. | 2.44 | 4.64 | 3.09 | 1.59 | 3.90 | 2.35 | 1.33 | 1.33 | 1.08 | 0.79 | 0.51 | 0.28 |
| Charge: | | | | | | | | | | | | |
| Mole fraction hydrocarbon ($N_{HC}$) | 0.54 | 0.11 | 0.41 | 0.70 | 0.25 | 0.55 | 0.75 | 0.75 | 0.80 | 0.85 | 0.90 | 0.95 |
| Recovery, percent by weight of charge: | | | | | | | | | | | | |
| Liquid product | 97.4 | 97.7 | 98.4 | 98.5 | 94.1 | 98.0 | 98.2 | 99.2 | 99.7 | 99.5 | 98.2 | 99.1 |
| Gas: | | | | | | | | | | | | |
| $C_1$ to $C_4$ incl. | 0.5 | 4.6 | 0.7 | 0.4 | 1.0 | 0.4 | 0.3 | 0.3 | 0.4 | 0.3 | 0.3 | 0.4 |
| $C_{5+}$ | 0.1 | 3.2 | 0.3 | 0.1 | 1.7 | 0.2 | 0.1 | 0.03 | 0.03 | 0.01 | 0.02 | 0.03 |
| Total | 98.0 | 105.5 | 99.4 | 99.0 | 96.8 | 98.6 | 98.6 | 99.5 | 100.1 | 99.8 | 98.5 | 99.5 |
| Product composition: | | | | | | | | | | | | |
| Mol. percent of charge: | | | | | | | | | | | | |
| $C_1$–$C_4$ incl. | 1.7 | 9.2 | 2.6 | 2.2 | 3.4 | 1.7 | 1.5 | 1.9 | 2.5 | 1.9 | 2.0 | 3.5 |
| iso-Pentane | 38.5 | 36.2 | 39.2 | 39.3 | 33.1 | 34.0 | 38.0 | 37.3 | 35.0 | 34.6 | 38.9 | 36.3 |
| n-Pentane | 59.6 | 57.5 | 58.1 | 57.5 | 64.3 | 64.0 | 60.3 | 60.3 | 61.3 | 63.0 | 58.3 | 59.4 |
| Cyclopentane | 1.2 | 1.4 | 1.3 | 1.9 | 0.8 | 1.1 | 1.0 | 1.4 | 1.2 | 1.4 | 1.8 | 1.4 |
| 2,2-dimethylbutane | | | | | | | | | 0.9 | | | 0.7 |
| Total | 101.0 | 104.3 | 101.2 | 100.9 | 101.6 | 100.8 | 100.8 | 100.9 | 100.9 | 100.9 | 101.0 | 101.3 |
| Mol. percent isomerization | 34.1 | 31.6 | 34.9 | 35.0 | 28.2 | 29.2 | 33.6 | 32.8 | 30.3 | 29.8 | 34.5 | 31.7 |
| Mol. percent conversion | 34.4 | 36.7 | 36.1 | 36.7 | 29.3 | 29.6 | 33.7 | 33.7 | 32.6 | 30.7 | 35.9 | 34.7 |
| Percent efficiency | 99.1 | 86.1 | 96.7 | 95.4 | 96.2 | 98.6 | 99.7 | 97.3 | 92.9 | 97.1 | 96.1 | 91.4 |
| Space-time yield $iC_5$ vol./hr./vol. | 2.08 | 0.38 | 1.58 | 2.74 | 0.78 | 1.79 | 2.80 | 2.75 | 2.70 | 2.84 | 3.40 | 3.34 |
| Olefin content of liquid product, Mole percent | | | 0.27 | 0.54 | | 0.36 | | 0.59 | 0.68 | 0.86 | 1.35 | 2.02 | about 830° F. and the pressure was 500 pounds per square inch gauge. The hydrocarbon content of the feed mixture was predominantly n-pentane and consisted essentially of 90.8 percent n-pentane, 7.8 percent isopentane, and 1.4 percent cyclopentane. A different feed hydrogen concentration was used for each run. Table I above records the process conditions and product data for each run of this series.

Certain of the product data from Table I are plotted in Figure 2 of the drawing. Curve A in Figure 2 is a plot of space-time-yield of isopentane against the mol fraction of hydrocarbon in the charge mixture for the series of runs described in Example I. Curve A shows an increase in space-time-yield of isopentane as the mol fraction of hydrocarbon in the charge mixture increases up to a value of about .94 mol fraction of hydrocarbon (corresponding to a hydrogen concentration of about 75 standard cubic feet per barrel of hydrocarbon). Further increase of the hydrocarbon concentration resulted in rapid deactivation or aging of the catalyst. This was demonstrated by run 12 carried out at a mol fraction of hydrocarbon of 0.95. This run is plotted as point B in Figure 2 and lies considerably below the curve traced by the space-time-yields for the other runs.

The deactivation of the catalyst at high hydrocarbon concentration of the feed is further shown by the circle B' plotted in Figure 1. This represents a space-time-yield of about 2.7 volumes of isopentane per volume of catalyst per hour which was obtained in a run with a catalyst and under conditions substantially the same as those of Example I but charging a feed mixture with a hydracarbon mol fraction of 0.97. The space-time-yields represented by points B and B' not only were lower than space-time-yields obtained at the points along curve A but the space-time-yield was rapidly declining during the throughput periods for which the products represented by points B and B' were collected.

Curve C in Figure 2 is a plot of olefin concentration of the product against mol fraction of hydrocarbon in the charge mixture for each of the runs. A comparison of curves A and C of Figure 2 shows that a marked increase in the rate of olefin formation occurs at substantially the same charge mixture hydrogen concentration at which rapid catalyst aging begins. As the curve shows, when the olefin concentration of the product is approximately 1.5 mol percent, the space-time-yield of isopentane is substantially at a maximum but the peak of curve A at which rapid catalyst aging occurs is not yet reached. Under the operating conditions of these runs the charge mixture composition which produces a concentration of 1.5 mol percent of olefins in the product is about 0.92 mol fraction of hydrocarbon.

We have carried out another series of hydroisomerization runs with a supported platinum catalyst different from that used in Example I and the results of these runs confirm the results discussed above in connection with Example I. Details of this second series of runs are described in Example II below.

EXAMPLE II

The catalyst used was a pelleted platinum-alumina catalyst which consisted essentially of 0.37 percent platinum, 0.24 percent chlorine, 0.58 percent fluorine and the balance alumina. The surface area of the fresh catalyst was 174.1 square meters per gram. The fixed bed isomerization reactor contained 60 cc. or 32 grams of the catalyst. The catalyst had been used previously for hydroisomerization of n-pentane for a total throughput of 456 weight units of n-pentane per unit of catalyst and after this use the catalyst had been regenerated by burning with a nitrogen stream containing small amounts of air at a maximum temperature of 900° F. following which the catalyst was heated in hydrogen to 1000° F. at a pressure of 500 pounds per square inch gauge, a hydrogen rate of 1.0 standard cubic feet of hydrogen per barrel per hour over a period of 4 hours. The predominantly n-pentane charge in this series of runs was the same as used in the runs of Example I. For each run the reaction temperature was about 810° F. and the pressure was 500 pounds per square inch gauge. A different hydrogen: hydrocarbon ratio for the charge was used for each run. Table II records the process conditions and the product data for each of the runs.

*Table II*

| Run No. | 13 | 14 | 15 | 16 | 17 | 18 | 19 | 20 | 21 | 22 | 23 | 24 |
|---|---|---|---|---|---|---|---|---|---|---|---|---|
| Throughput age at start of cycle | 622 | 639 | 661 | 687 | 715 | 744 | 775 | 833 | 862 | 894 | 927 | 956 |
| Temperature, °F | 810 | 810 | 810 | 810 | 810 | 811 | 809 | 810 | 810 | 810 | 811 | 810 |
| Pressure, p.s.i.g. | 500 | 500 | 500 | 500 | 500 | 500 | 500 | 500 | 500 | 500 | 500 | 500 |
| Space velocity, vol./hr./vol. | 4.8 | 6.6 | 8.4 | 8.9 | 9.6 | 10.2 | 10.2 | 8.4 | 10.8 | 10.8 | 10.8 | 8.4 |
| Hydrogen feed rate, s.c.f./hr. | 3.13 | 2.45 | 1.55 | 1.33 | 0.94 | 0.74 | 0.74 | 1.60 | 0.50 | 0.50 | 0.49 | 1.60 |
| Charge: Mole fraction hydrocarbon ($N_{HC}$) | 0.40 | 0.54 | 0.71 | 0.75 | 0.82 | 0.86 | 0.86 | 0.70 | 0.90 | 0.91 | 0.91 | 0.70 |
| Recovery, percent by weight of charge: | | | | | | | | | | | | |
| Liquid product | 95.7 | 98.0 | 99.4 | 98.8 | 97.9 | 98.5 | 99.3 | 98.2 | 99.2 | 99.1 | 98.9 | 98.8 |
| Gas: | | | | | | | | | | | | |
| $C_1$ to $C_4$ incl. | 0.4 | 0.3 | 0.2 | 0.2 | 0.2 | 0.2 | 0.2 | 0.3 | 0.2 | 0.2 | 0.2 | 0.3 |
| $C_{5+}$ | 0.3 | 0.2 | 0.1 | 0.04 | 0.1 | 0.03 | 0.03 | 0.1 | 0.01 | 0.04 | 0.02 | 0.1 |
| Total | 96.4 | 98.5 | 99.7 | 99.0 | 98.2 | 98.7 | 99.5 | 98.6 | 99.4 | 99.3 | 99.1 | 99.2 |
| Product composition: | | | | | | | | | | | | |
| Mol. percent of charge: | | | | | | | | | | | | |
| $C_1$–$C_4$ incl. | 1.5 | 1.7 | 1.1 | 1.0 | 1.1 | 1.7 | 0.7 | 0.9 | 1.5 | 1.4 | 1.2 | 1.0 |
| iso-Pentane | 38.9 | 38.5 | 38.9 | 40.6 | 41.8 | 44.7 | 42.7 | 38.7 | 44.5 | 43.5 | 42.2 | 34.5 |
| n-Pentane | 59.2 | 59.4 | 59.0 | 57.4 | 56.1 | 53.1 | 55.1 | 59.3 | 53.1 | 53.8 | 55.3 | 63.4 |
| Cyclopentane | 1.1 | 1.2 | 1.5 | 1.7 | 1.5 | 1.3 | 1.7 | 1.5 | 1.4 | 1.7 | 1.4 | 1.5 |
| 2,2-dimethylbutane | | | | | | | | | 0.1 | 0.2 | 0.4 | |
| Total | 100.7 | 100.8 | 100.5 | 100.7 | 100.5 | 100.8 | 100.2 | 100.4 | 100.6 | 100.6 | 100.5 | 100.4 |
| Mol. percent isomerization | 34.5 | 34.1 | 34.5 | 36.4 | 37.7 | 40.9 | 38.7 | 34.3 | 40.7 | 39.6 | 38.2 | 29.7 |
| Mol. percent conversion | 34.9 | 34.7 | 35.1 | 36.9 | 38.3 | 41.6 | 39.4 | 34.8 | 41.6 | 40.8 | 39.2 | 30.3 |
| Percent efficiency | 98.9 | 98.3 | 98.3 | 98.6 | 98.4 | 98.3 | 98.2 | 98.6 | 97.8 | 97.1 | 97.4 | 98.0 |
| Space-time yield $iC_5$ vol./hr./vol. | 1.53 | 2.10 | 2.81 | 3.03 | 3.39 | 3.86 | 3.65 | 2.68 | 4.06 | 3.99 | 3.90 | 2.33 |
| Olefin content of liquid product, mole percent | | 0.32 | 0.50 | 0.45 | 0.50 | 0.63 | 0.68 | 0.36 | 0.72 | 0.77 | 0.81 | 0.36 |

Figure 3 of the drawing plots certain of the product data from Table II. Curve E in Figure 3 is a plot similar to curve A in Figure 2 of the space-time-yield of isopentane against the composition of the charge mixture in terms of mol fraction of hydrocarbon. Curve F, like curve C of Figure 2 is a plot of olefin concentration of the product against the composition of the charge mixture. Curve F shows that an olefin concentration in the product of about 1.0 mol percent or less corresponds to the mol fraction of hydrocarbon in the feed at which rapid deactivation of the catalyst occurs under the conditions of these runs and with the particular catalyst used. The two circles G represent the space-time-yields obtained in runs 22 and 23 in which the charge mixture had a hydrocarbon mol fraction of 0.91. These two runs demonstrate the catalyst deactivation that occurs when the hydrogen concentration of the feed is too low. G' represents the space-time-yield obtained in run 24 using a feed composition similar to that of runs 15 and 20 but performed after the catalyst had been deactivated by operating with an excessively high hydrocarbon concentration for the feed. At point G' the space-time-yield was only about 2.3, considerably below the space-time-yields obtained at the points along curve E. This shows that the deactivation of a catalyst caused by using an excessively high hydrocarbon concentration for the feed cannot be restored merely by decreasing the hydrocarbon concentration below the concentration which initially caused rapid deactivation.

In addition to our discovery of the correlation between olefin content of the isomerization product and catalyst aging rate, we have discovered that theoretical olefin concentrations obtained by thermodynamic calculations on the pentanes-pentenes-hydrogen system agree almost identically with the data obtained in actual runs and we have developed a mathematical relationship for variables of the pentane isomerization process such as temperature, pressure, hydrogen-pentane feed ratio and olefin concentration of the product. We have found that the required hydrogen-pentane mol feed ratio required to produce any specified mol fraction of pentenes in the product is expressed by the following equation:

$$(1) \quad r = \frac{(1-x^2)b - x^2(1+a)}{x(1+a+b) - b}$$

wherein $r$ is the mol ratio of hydrogen to pentane in the feed; $x$ is the mol fraction of pentenes in the product; $a$ is the equilibrium constant for the isomerization of n-pentane to isopentane; and $b$ is the quotient of the sum of the equilibrium constants for the dehydrogenation of n-pentane to each of the pentenes divided by the total absolute pressure in atmospheres.

We have calculated olefin yields for the runs of Examples I and II using equation (1) and have plotted them in Figures 2 and 3 of the drawing. They are represented by the small circles such as D in Figure 2 and H in Figure 3 which lie substantially along curves C and F. The plots show that the calculated olefin yields agree substantially identically with the yields obtained in the actual runs of Examples I and II. Thus, in accordance with the invention, we can use Equation 1 to determine the minimum hydrogen concentration that can be used with a particular catalyst under any given hydroisomerization conditions without deactivating the catalyst rapidly.

Example II shows that if the hydrogen is reduced below a minimum hydrogen concentration which corresponds to about 0.01 mol fraction olefins in the product, the catalyst is rapidly deactivated. Within the temperature range preferred for hydroisomerization of n-pentane, from about 800° to 850° F., the feed composition which will produce the maximum permissible olefin concentration in the product of 0.01 mol fraction can be obtained by substituting 0.01 for $x$ in Equation 1 above. The minimum hydrogen to pentane mol feed ratio for avoiding rapid aging of the catalyst of Example II can then be expressed as:

$$(2) \quad r = \frac{0.9999b - 0.0001(1+a)}{0.01(1+a+b) - b}$$

Over the preferred temperature range, $a$ and $b$ can be expressed as follows:

$$(3) \quad a = 0.541 \times 10^{\frac{408}{T}}$$

$$(4) \quad b = \frac{2.72}{P} \times 10^{\left(7 - \frac{5900}{T}\right)}$$

In Equations 3 and 4 T is absolute temperature in degrees Kelvin and P is absolute pressure in atmospheres. Substituting values of $a$ and $b$ for the particular temperature and pressure employed, Equation 2 can be very useful for determining the feed composition to be used in hydroisomerization of n-pentane. For example, when the temperature is to be raised to maintain catalyst activity during the gradual decline of catalyst activity over a long-cycle run, as we discuss more fully below, Equation 2 can advantageously be used to determine the minimum feed hydrogen concentration for the higher temperature. The hydrogen concentration is thus adjusted in accordance with Equation 2 to keep the product olefin concentration substantially constant and rapid aging of the catalyst is avoided.

Examples I and II and their data as plotted in Figures 2 and 3 show the important practical discovery we have made with regard to the relationship between catalyst deactivation and olefin content of the isomerization product. With this discovery it is possible in accordance with our invention to control the hydroisomerization of n-pentane in such a manner as to obtain high yields of isopentane without running the danger of rapid catalyst deactivation. With our discovery it is possible to use olefin concentration of the product as an indication of the proper level of operating conditions. The hydrogen concentration of the feed is one of the variables of the process most subject to fluctuation in refinery operations. In the hydroisomerization of n-pentane at low hydrogen concentrations and high space velocity to obtain a high space-time-yield, any fluctuation in the direction of reduction of the hydrogen concentration can have serious consequences. As curves A and E of Figures 2 and 3 show, a slight decrease in hydrogen concentration near the peak of the space-time-yield curve can cause rapid catalyst deactivation. Furthermore, this is a permanent deactivation in that the activity is not restored merely by raising the hydrogen concentration. The catalyst must be regenerated by burning off carbonaceous deposits in order to restore its original activity after it has once been lost by operating with an excessively low hydrogen concentration. The olefin concentration of the product can be readily measured by known methods and equipment. In this respect it contrasts sharply with the more direct indication of catalyst deactivation, namely the build-up of carbon on the catalyst, which cannot readily be measured during the process. Accordingly, we have made a valuable improvement in the control of the isomerization process through the use of the olefin concentration of the product as an indicator for setting the process variables, particularly the variable of feed concentration. At the high space velocities employed in the process of the invention the time lag between the change of feed composition and its first effect on the product emerging from the reactor is relatively short. It is sufficiently short that the steps can be taken when analysis shows that the product olefin concentration is excessive to correct the feed composition before catalyst deactivation has gone too far.

In accordance with the principles discussed above, an important advantage of our process is to provide a means for correcting fluctuations in the hydrogen concentration of the feed which might cause catalyst deactivation. Thus, if for any reason the hydrogen flow rate to the hydroisomerization reactor should drop either suddenly or gradually, the result will be an increase in olefin concentration in the product. When product control measurements indicate this, the feed composition can be corrected by increasing hydrogen flow rate or decreasing the hydrocarbon flow rate.

In using a long-life platinum-alumina catalyst for hydroisomerization, the activity of the catalyst gradually declines even though the process is carried out with a hydrogen concentration sufficiently high to prevent rapid catalyst deactivation. Accordingly the space-time-yield of isopentane gradually decreases. The proper procedure under such circumstances is to increase the reaction temperature sufficiently to increase the yield of isopentane to the desired level. However, if the temperature is raised without changing other process variables, such as feed composition, the olefin concentration of the product will increase and in a short time the catalyst activity will decline rapidly. Thus, when the temperature is raised to maintain yields it is also necessary to raise the hydrogen concentration in order to avoid catalyst deactivation. In accordance with the invention, when the temperature is periodically raised, the hydrogen concentration of the feed is also raised in response to measurement of the olefin concentration of the product so as to maintain the olefin concentration substantially at the same level as was obtained before the temperature was increased. By maintaining a substantially constant olefin concentration in the product the yield of isopentane can be maintained at a high level without excessively aging the catalyst. Therefore, one modification of our process comprises the procedure of raising reaction temperature when product yield declines below a desired level, measuring the olefin content of the isomerization product and raising the hydrogen concentration of the feed in response to changes in the olefin concentration of the product whereby to maintain the olefin concentration substantially constant.

We have discussed the measuring of product olefin concentration in our process. This can be done in a number of different ways. Thus, in the runs of Examples I and II the product olefin concentrations were determined from bromine numbers of the isomerization products obtained in accordance with ASTM Test D1159. Various other conventional batch or continuous analysis techniques can also be used. In refinery scale operations of our process it is particularly advantageous to use a continuous analyzing technique such as analysis by continuous spectrometry. The particular means to be used for this purpose is not a part of our invention. In our process a number of commercial analyzing control instruments can be adapted for continuously measuring the olefin content of the product and controlling hydrogen feed rate in response to changes in the olefin content. Instruments that can be adapted for this use include an automatic differential refractometer which continuously measures deviations of refractive index of a liquid stream. A mass spectrometer adapted for continuous analysis and provided with intermediate scanning means can also be used. A combination of several analyzing-control instruments employing continuous infrared absorption spectrometry and having means for totaling the measurements for each of the several olefins in the product can also be adapted for use in the process.

We will now describe an apparatus in which the process of the invention can be carried out. Suitable apparatus is shown diagrammatically in Figure 1 of the drawing. The apparatus comprises a hydroisomerization reactor 30 containing a fixed bed of supported platinum catalyst particles. The n-pentane feed is charged to the system via line 31. It passes through the feed preheater 32 where it is heated to reaction temperature and then passes via line 33 into the reactor 30. Fresh hydrogen in a regulated amount is charged to the system via line 34. The hydrogen also is heated in the preheater 32 and the heated hydrogen stream is mixed with the vaporized pentane stream in line 33 before entering reactor 30. The isomerization product is withdrawn from reactor 30 via line 35 which passes through an analyzing-control means 36 which is adapted to measure small olefin concentrations in the product stream and transmit control impulses to a valve control means. In the embodiment of the drawing, this means takes the form of a controller 37 pneumatically connected with a diaphragm control for valve 38 in the hydrogen line 34. After passing through the analyzer the isomerization product stream passes through a condenser 39 wherein normally liquid hydrocarbons are condensed. The cooled product then passes to the separator 40 where uncondensed gases are separated from the isomerized pentane product. An analyzing-controller such as a continuous refractometer which analyzes liquid mixtures would be placed in the product line after the condenser 39 or in the liquid withdrawal line from separator 40 instead of before the condenser, as shown in the drawing. The uncondensed gases recovered from the separator 40 via line 41 are preferably passed through a light oil scrubber, not shown in the drawing, to reduce the hydrocarbon content of the gas. The remaining hydrogen is then recycled via line 42 to the hydrogen inlet line 34.

We have described our invention with regard to isomerization runs carried out with specific catalysts and under specific operating conditions. However, the principles of the invention involving the control of process variables in response to changes in the olefin content of the isomerization product apply in general to the types of catalysts and ranges of process conditions for isomerizing n-pentane which are disclosed in the Starnes and Zabor patent application Serial No. 508,980, filed May 17, 1955. Thus, the principles of the invention apply in general to the control of n-pentane hydroisomerization using a high space velocity and a low feed hydrogen concentration wherein minor variations in hydrogen concentration can seriously affect space-time-yield of isomer product or catalyst life.

Ranges of conditions described in th mentioned patent application include feed ratios of hydrogen to hydrocarbon of from about 50 to 1000 standard cubic feet of hydrogen per barrel of hydrocarbon in the charge. Stated in other units, this range is from about 0.96 to 0.53 mol fraction of hydrocarbon in the charge. It should be understood, however, that within this range the minimum permissible hydrogen concentration to avoid rapid catalyst deactivation may, for a particular catalyst and particular operating conditions, be somewhat greater than the lower limit of the range. Reaction pressures for the type of process to which the invention applies range from about 50 to 1000 pounds per square inch gauge. The temperature can range from 700° to 1000° F. The space velocity, which is higher than is used in naphtha reforming, is above 5 liquid volumes of charge per volume of catalyst per hour. Normally, the space velocity will be above 8 volumes per volume per hour and in some operations it may be as high as 20 or more volumes per volume per hour.

The catalysts used in the type of process to which the invention applies are supported platinum catalysts. Such catalysts comprise a minor amount of platinum and a major amount of a supporting material. The catalyst can be in the form of irregular granules or of particles of uniform size and shape prepared by pilling, extrusion or other suitable methods. Generally, the platinum content is 0.1 to 5.0 percent by weight and preferably is about 0.2 to 1.0 percent by weight. The preferred support or carrier is alumina. Other suitable supports or carriers include silica-stabilized alumina; fresh, aged or deactivated silica-alumina composites; silica-magnesia; bauxite and the like. The catalyst preferably contains minor amounts, for example from 0.1 to 10 percent by weight, of combined halogen and/or other activating components. Halogen compounds or other activating components can also be included in the feed to the process.

Obviously many modifications and variations of the invention as hereinbefore set forth may be made without departing from the spirit and scope thereof and therefore only such limitations should be imposed as are indicated in the appended claims.

We claim:

1. A hydroisomerization process which comprises contacting in admixture with hydrogen a predominantly n-pentane hydrocarbon fraction with a supported platinum catalyst at a temperature from 700° to 1000° F. and a liquid-hourly space velocity of at least 5 volumes of hydrocarbon per volume of catalyst per hour, the concentration of hydrocarbon in admixture with said hydrogen being less than the concentration which corresponds to rapid catalyst aging at the isomerization conditions employed, recovering an isomerization product, measuring the olefin concentration of said product and adjusting the hydrogen concentration in admixture with said hydrocarbon fraction in response to changes in said olefin concentration whereby to maintain said olefin concentration at a level corresponding to high space-time-yield of isopentane but below the olefin concentration corresponding to rapid catalyst deactivation.

2. A hydroisomerization process which comprises contacting in admixture with hydrogen a predominantly n-pentane hydrocarbon fraction with a supported platinum catalyst at a temperature from 700° to 1000° F. and a liquid-hourly space velocity of at least 5 volumes of hydrocarbon per volume of catalyst per hour, the concentration of hydrocarbon in admixture with said hydrogen being greater than a mol fraction of 0.5 and less than the concentration which corresponds to rapid catalyst aging at the isomerization conditions employed, recovering an isomerization product, measuring the olefin concentration of said product and increasing the hydrogen concentration in admixture with said hydrocarbon fraction in response to changes in said olefin concentration whereby to maintain said olefin concentration substantially constant at a level below the level corresponding to rapid catalyst deactivation.

3. A hydroisomerization process which comprises contacting in admixture with hydrogen a predominantly n-pentane hydrocarbon fraction with a supported platinum catalyst at a temperature from 700° to 1000° F. and a liquid-hourly space velocity of at least 5 volumes of hydrocarbon per volume of catalyst per hour, the concentration of hydrocarbon in admixture with said hydrogen being greater than a mol fraction of 0.5 and less than the concentration which corresponds to rapid catalyst aging at the isomerization conditions employed, recovering an isomerization product, measuring the olefin content of said product, raising the reaction temperature when the rate of conversion of the hydrocarbon charge decreases below a desired level and simultaneously raising the hydrogen concentration of the charge mixture in an amount sufficient to maintain substantially constant the olefin content of the isomerization product.

4. A hydroisomerization process which comprises contacting a feed comprising hydrogen and n-pentane with a supported platinum catalyst at a temperature from 700° to 1000° F. and a liquid-hourly space velocity of at least 5 volumes of hydrocarbon per volume of catalyst per hour, the concentration of hydrocarbon in said feed being greater than a mol fraction of 0.5 and less than the concentration which corresponds to rapid catalyst aging at the isomerization conditions employed, recovering an isomerization product, measuring the olefin content of said product, periodically raising the reaction temperature when the rate of conversion of the hydrocarbon charge decreases below a desired level whereby to restore said rate of conversion substantially to its original level, and maintaining substantially constant the olefin content of the isomerization product when said temperature is raised by simultaneously raising the hydrogen concentration of the feed to a value as expressed by the following equation:

$$r = \frac{(1-x^2)b - x^2(1+a)}{x(1+a+b) - b}$$

wherein $r$ is the mol ratio of hydrogen to pentane in the feed; $x$ is the mol fraction of pentenes in the isomerization product;

$$a = 0.541 \times 10^{\frac{408}{T}}$$

and $$b = \frac{2.72}{P} \times 10^{\left(7 - \frac{5900}{T}\right)}$$

$T$ being the absolute temperature in degrees Kelvin and $P$ being the absolute pressure in atmospheres.

5. A hydroisomerization process which comprises contacting a feed comprising hydrogen and n-pentane with a catalyst consisting essentially of 0.2 to 1.0 weight percent platinum, 0.1 to 10 percent halogen, and the balance alumina, at a temperature from 800° to 850° F., a pressure from 50 to 1000 pounds per square inch gauge, and a liquid hourly space velocity of at least 8 volumes of hydrocarbon per volume of catalyst per hour, the concentration of hydrocarbon in said feed being greater than a mol fraction of 0.5 and less than the concentration which corresponds to rapid catalyst aging at the isomerization conditions employed, recovering an isomerization product, measuring the olefin concentration of said product and maintaining the olefin concentration of said product substantially constant at about 1.0 mol percent of olefin based on the total hydrocarbon product by using reaction conditions of temperature, pressure and mol ratio of hydrogen to hydrocarbon in the feed in accordance with the following equation:

$$r = \frac{0.9999b - 0.0001(1+a)}{0.01(1+a+b) - b}$$

wherein $r$ is the mol ratio of hydrogen to pentane in the feed;

$$a = 0.541 \times 10^{\frac{408}{T}}$$

and $$b = \frac{2.72}{P} \times 10^{\left(7 - \frac{5900}{T}\right)}$$

$T$ being the absolute temperature in degrees Kelvin and $P$ the absolute pressure in atmospheres.

References Cited in the file of this patent

UNITED STATES PATENTS

| Number | Name | Date |
|---|---|---|
| 2,462,946 | Coggeshall et al. | Mar. 1, 1949 |
| 2,479,110 | Haensel | Aug. 16, 1949 |
| 2,550,531 | Ciapetta | Apr. 24, 1951 |
| 2,642,384 | Cox | June 16, 1953 |
| 2,645,605 | Lang et al. | July 14, 1953 |
| 2,736,684 | Tarnpoll | Feb. 28, 1956 |
| 2,831,908 | Starnes et al. | Apr. 22, 1958 |

OTHER REFERENCES

Randall et al.: "Infrared Determination of Organic Structures," page 52, Van Nostrand Co., Inc., 1949.